Jan. 7, 1941. A. GRABNER 2,228,077
ALTERNATING-CURRENT COMMUTATOR MOTOR
Filed Oct. 7, 1939 2 Sheets-Sheet 1

WITNESSES:
C. J. Weller.
7. P. Lyle

INVENTOR
Alfred Grabner.
BY O. R. Buchanan
ATTORNEY

Jan. 7, 1941.   A. GRABNER   2,228,077
ALTERNATING-CURRENT COMMUTATOR MOTOR
Filed Oct. 7, 1939   2 Sheets-Sheet 2

WITNESSES:

INVENTOR
Alfred Grabner.
BY
ATTORNEY

Patented Jan. 7, 1941

2,228,077

UNITED STATES PATENT OFFICE 2,228,077

ALTERNATING-CURRENT COMMUTATOR MOTOR

Alfred Grabner, Vienna, Germany, assignor to Westinghouse Electric & Manufacturing Company, East Pittsburgh, Pa., a corporation of Pennsylvania Application October 7, 1939, Serial No. 298,453
In Germany September 22, 1938

7 Claims. (Cl. 172—276)

The present invention relates to alternating-current commutator motors, and more particularly to means for improving the commutation of such motors.

Alternating-current commutator motors, and especially railway motors, are usually built with commutating poles or interpoles placed between the main poles to provide a commutating field. The interpoles are provided with windings which produce a flux linking the rotor conductors immediately under the interpoles so that an electromotive force is induced in the conductors which assists in commutation of the rotor current.

The slots of the rotor, however, cause distortion of this commutating field since the flux tends to be concentrated in the rotor teeth so that the commutating field in the air gap is more or less fan-shaped. Thus, the distribution of the commutating flux in the air gap and through the rotor conductors is not sinusoidal and a non-sinusoidal electromotive force is induced in the rotor conductors. Since the rotor current is usually substantially sinusoidal, this condition results in unsatisfactory commutation, causing burning of the commutator bars and rapid wear of the brushes. The rotor slots cannot be made small enough to prevent this distortion of the commutating field from occurring, and it is not practical to increase the air gap sufficiently to avoid the effect. The use of semi-closed or oblique slots has little effect and does not materially improve the commutation.

The object of the present invention is to improve the commutation of alternating-current commutator motors by providing a substantially sinusoidal commutating field.

More specifically, the object of the invention is to eliminate the distortion of the commutating field by providing means for damping out the harmonic components of the non-sinusoidal flux, leaving only the substantially sinusoidal fundamental component so that a sinusoidal electromotive force is induced in the rotor conductors.

These objects are preferably attained by providing a damper winding associated with the interpoles and connected in such a manner that the harmonic components of the commutating flux are damped out while the fundamental component is not affected. This winding may take various forms, but it is preferably connected in such a manner that it encircles all the commutating poles in the same direction and extends completely around the machine. It is essential that the damper winding be placed immediately adjacent the air gap and as close as possible to the rotor surface, since the distortion of the commutating field caused by the rotor slots occurs only in the air gap and rotor surface, and is not noticeable in the body of the interpole. For this reason the damper winding should be placed in the face of the interpoles or otherwise located closely adjacent the air gap.

The invention will be more fully understood from the following detailed description, taken in connection with the accompanying drawings in which.

Figure 1:
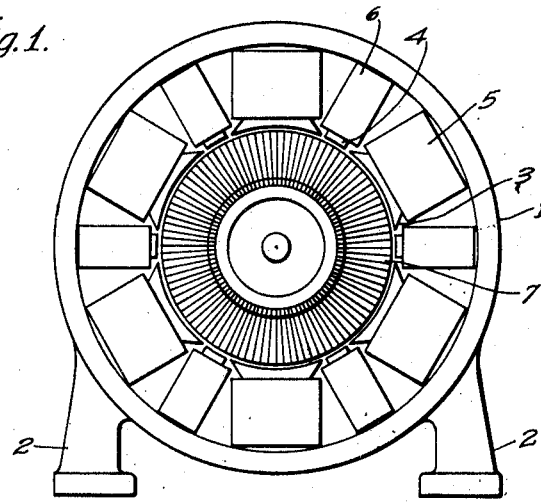
Figure 1 is a somewhat diagrammatic elevational view of an alternating-current commutator motor with which the invention may be used.

Figure 1 shows somewhat diagrammatically the general construction of a commutator motor of a type with which this invention may be used. The motor shown in this figure has a generally cylindrical stator frame 1, which has feet 2 and on which are supported a plurality of main poles 3 and interpoles 4. Field windings 5 are placed on the main poles and suitable interpole windings 6 are placed on the interpoles to provide the desired commutating field to assist the commutation. The rotor 7 is mounted on a shaft 8 and has a commutator 9 to which the rotor conductors are connected, as indicated at 10. The rotor conductors are placed in slots in the rotor and are connected to form a suitable winding of any desired type. A six-pole machine has been shown, but it will be understood that the invention is applicable to machines of any number of poles.

Figure 2:
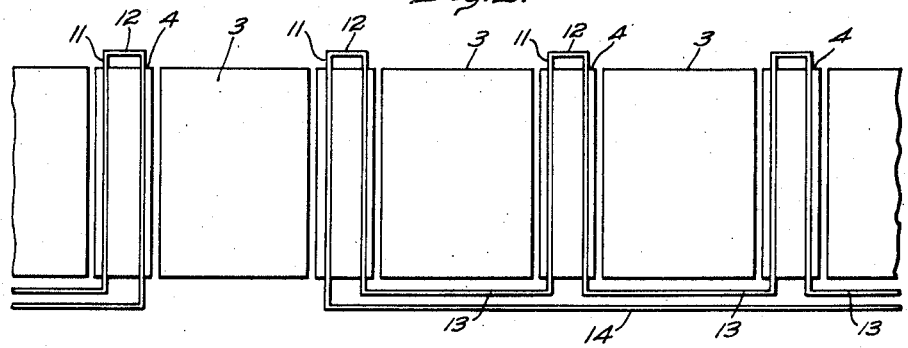
Fig. 2 is a developed plan view of a portion of a stator showing one embodiment of the invention.

As explained above, the rotor slots cause distortion of the commutating flux by concentrating it in the teeth of the rotor, so that a non-sinusoidal distribution of the flux is obtained and unsatisfactory commutation results. In order to overcome this effect and to obtain a substantially sinusoidal commutating flux, the present invention provides a damper winding associated with the interpoles to damp out the harmonic components of the non-sinusoidal commutating flux. As shown in Fig. 2, this winding may take the form of bars 11 of conducting material, such as copper, placed in the faces of the interpoles so as to be immediately adjacent the air gap and as close as possible to the rotor surface. The bars on each interpole are connected at one end by an end connection 12 and at the other end each bar is connected to a bar of the adjacent interpole by end connections 13. As shown in Fig. 2, an end connection 14 is provided which extends around the stator and connects the last bar at each end of the winding, so that a winding is formed which extends completely around the stator but which is not connected at its ends.

Figure 3:
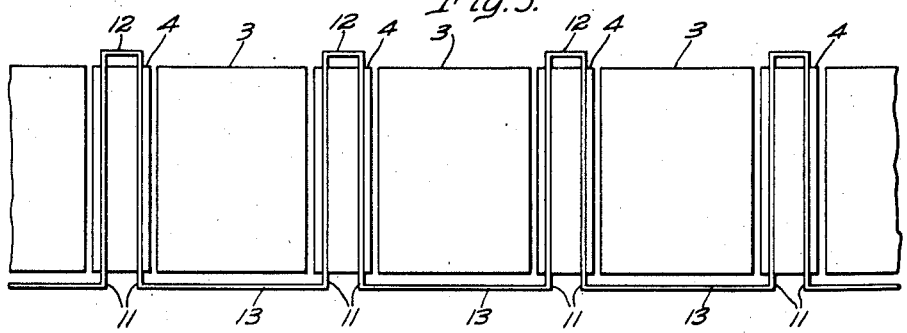
Fig. 3 is a view similar to Fig. 2 showing a slightly modified form of the invention.

In Fig. 3 a slightly different arrangement is shown in which the winding is continuous around the stator and the end connection 14 is omitted. It will be noted in both of these arrangements that the end connections between interpoles are all on the same side of the machine, so that the winding encircles all the interpoles in the same direction. Since successive interpoles have opposite polarity, the effect of this winding arrangement is to neutralize the effect of the damper winding on the fundamental component of the commutating flux produced by the interpole winding. The harmonic components of this flux, however, will be damped out by the winding, since their relative phase position is not the same as that of the fundamental component. In this way, the harmonic components of the non-sinusoidal commutating flux are eliminated and the substantially sinusoidal fundamental component remains unaffected, so that the commutating electromotive force induced in the rotor conductors is substantially sinusoidal and practically perfect commutation can be readily obtained.

Figure 4:
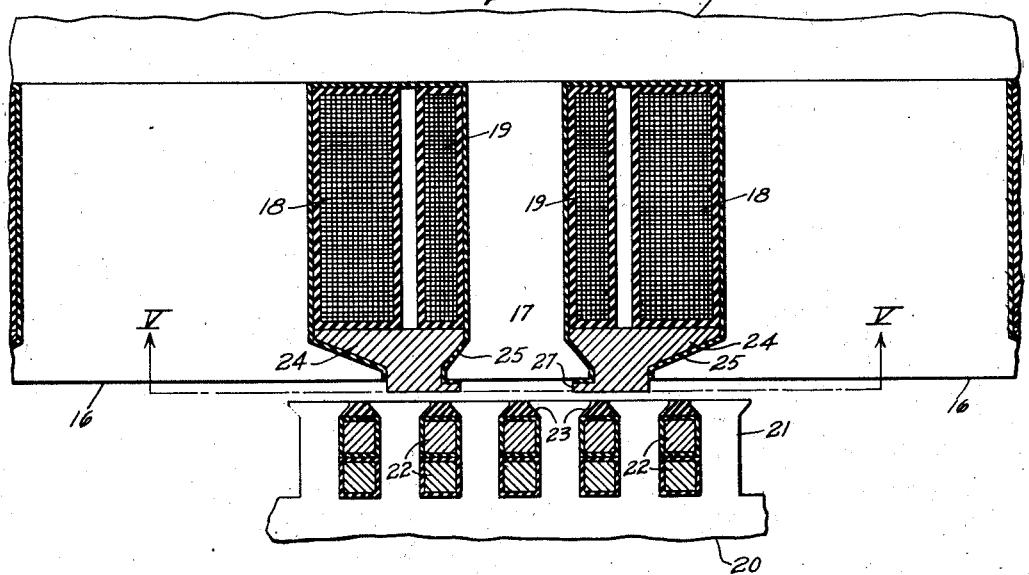
Fig. 4 is a somewhat diagrammatic fragmentary transverse sectional view through the rotor and stator of a motor showing another embodiment of the invention.
Figure 5:
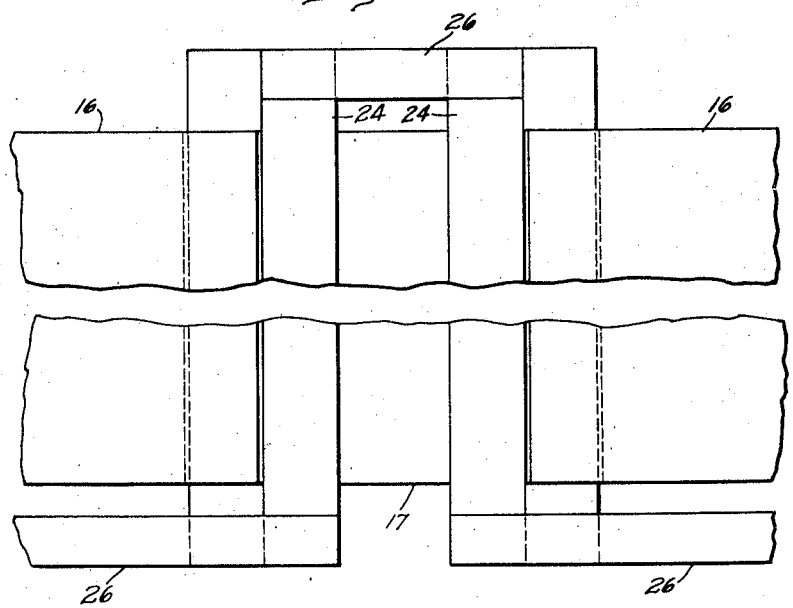
Fig. 5 is a view substantially on the line V—V of Fig. 4.

Another embodiment of the invention is shown in Figs. 4 and 5, which show somewhat diagrammatically a motor having a stator member 15 on which are provided main pole pieces 16 and interpoles 17. Suitable field windings 18 are placed on the main poles 16 and windings 19 are provided on the interpoles to produce the necessary commutating flux. The rotor 20 has a plurality of teeth 21 forming slots in which the rotor conductors 22 are placed and which are closed by suitable slot wedges 23.

In this embodiment of the invention the damper winding for eliminating the harmonic components of the commutating flux is formed by wedge members 24 inserted in the spaces between the interpoles and the main poles. These wedge members are made of conducting non-magnetic material, such as copper, and may be insulated from the poles as indicated at 25. The wedge members 24 are extended beyond the pole pieces at each end as shown in Fig. 5, and adjacent wedge members are connected together by strap conductors 26, which may be brazed or soldered to the wedge members, or connected to them in any other suitable manner. The wedge members associated with each interpole are connected to those of the adjacent interpole, preferably in the same manner as the bars 11 in Fig. 3, although they may be connected as shown in Fig. 2, or in any other manner which will provide a continuous winding extending around the stator and encircling all of the interpoles in the same direction.

It will be apparent that the effect of the embodiment of the invention shown in Figs. 4 and 5 will be the same as that of Figs. 2 and 3, since the wedge members 24 and connectors 26 form a winding associated with the interpoles which extends around the motor and which has the same effect in damping the harmonic components of the commutating flux while leaving the fundamental component unaffected, so that a substantially sinusoidal commutating field is obtained. The wedge members 24 are positioned in the spaces between the interpoles and main poles in such a manner that they are as close as possible to the air gap so as to have the maximum effect in reducing the distortion of the commutating field, and in some cases it may be desirable to extend the wedge members into the air gap as indicated at 27, so as to increase their effectiveness by bringing them as close as possible to the rotor surface.

It should now be apparent that in both the embodiments of the invention, a damper winding has been provided associated with the interpoles of an alternating-current commutator motor which has the effect of eliminating the distortion of the commutating field caused by the rotor slots. Any suitable means may be used to form a damper winding associated with the interpoles in the manner described above. Such a winding must be placed as close as possible to the rotor surface, or at least in the immediate vicinity of the air gap, since the distortion of the field occurs only in the air gap and through the rotor surface, and if the winding is placed too far from the air gap, it will have no effect on the field in the air gap. It is also important that the winding be so arranged and connected that it encircles successive interpoles of opposite polarity in the same direction, so that the fundamental component of the commutating flux is unaffected.

It will be seen, therefore, that a very effective and relatively simple means has been provided for improving the commutation of an alternating-current commutator motor, and that it is applicable to either single-phase or polyphase motors. It is to be understood that although certain specific embodiments of the invention have been illustrated and described, it is capable of various other embodiments and modifications without departing from the spirit of the invention. The invention is not limited, therefore, to the exact arrangements illustrated and described, but in its broadest aspects it includes all equivalent embodiments and modifications which come within the scope of the appended claims.

I claim as my invention:

1. In an alternating-current dynamo-electric machine of the commutator type, a rotor member having a winding disposed in slots therein, a stator member having main pole pieces and interpoles thereon, main field windings on the main pole pieces, commutating field windings on the interpoles for producing a commutating flux, and a damper winding associated with the interpoles, said damper winding extending continuously around the machine and being arranged so that it encircles all the interpoles in the same direction, whereby the harmonic components of the commutating flux will be damped out while the fundamental component will be unaffected.

2. In an alternating-current dynamo-electric machine of the commutator type, a rotor member having a winding disposed in slots therein, a stator member having main pole pieces and interpoles thereon, main field windings on the main pole pieces, commutating field windings on the interpoles for producing a commutating flux, and a damper winding disposed in the faces of the interpoles, said damper winding extending continuously around the machine and being connected so as to damp out the harmonic components of the commutating flux.

3. In an alternating-current dynamo-electric machine of the commutator type, a rotor member having a winding disposed in slots therein, a stator member having main pole pieces and interpoles thereon, main field windings on the main pole pieces, commutating field windings on the interpoles for producing a commutating flux, and a damper winding comprising bars disposed in the faces of the interpoles and connected together to form a continuous winding extending around the machine, the connections being such that harmonic components of the commutating flux are damped out while the fundamental component is unaffected.

4. In an alternating-current dynamo-electric machine of the commutator type, a rotor member having a winding disposed in slots therein, a stator member having main pole pieces and interpoles thereon, main field windings on the main pole pieces, commutating field windings on the interpoles for producing a commutating flux, and a damper winding comprising bars disposed in the faces of the interpoles and connected together to form a continuous winding extending around the machine, the connections between adjacent interpoles all being on the same side of the machine, whereby the damper winding encircles all of the interpoles in the same direction and harmonic components of the commutating flux are damped out while the fundamental component is unaffected.

5. In an alternating-current dynamo-electric machine of the commutator type, a rotor member having a winding disposed in slots therein, a stator member having main pole pieces and interpoles thereon, main field windings on the main pole pieces, commutating field windings on the interpoles for producing a commutating flux, a conducting member extending along each side of each interpole closely adjacent the air gap, all of said conducting members being connected together in a series circuit to form a winding extending around the machine, the connections between the conducting members of adjacent interpoles all being on the same side of the machine, whereby the winding is adapted to damp out harmonic components of the commutating flux while the fundamental component is unaffected.

6. In an alternating-current dynamo-electric machine of the commutator type, a rotor member having a winding disposed in slots therein, a stator member having main pole pieces and interpoles thereon, main field windings on the main pole pieces, commutating field windings on the interpoles for producing a commutating flux, wedges of conducting, non-magnetic material disposed in the spaces between the main pole pieces and the interpoles, and connections between said wedges to form a winding extending around the machine which is adapted to damp out harmonic components of the commutating flux.

7. In an alternating-current dynamo-electric machine of the commutator type, a rotor member having a winding disposed in slots therein, a stator member having main pole pieces and interpoles thereon, main field windings on the main pole pieces, commutating field windings on the interpoles for producing a commutating flux, wedges of conducting, non-magnetic material disposed in the spaces between the main pole pieces and the interpoles, all of said wedges being connected together to form a winding extending around the machine, the connections being so arranged that the winding encircles all the interpoles in the same direction, whereby it is adapted to damp out harmonic components in the commutating flux while the fundamental component is unaffected.

ALFRED GRABNER.